(12) United States Patent
Salkintzis

(10) Patent No.: US 11,429,968 B2
(45) Date of Patent: Aug. 30, 2022

(54) PROVIDING NETWORK ACCESS USING BLOCKCHAIN PAYMENTS

(71) Applicants: Lenovo (Singapore) PTE. LTD., New Tech Park (SG); Apostolis Salkintzis, Athens (GR)

(72) Inventor: Apostolis Salkintzis, Athens (GR)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 308 days.

(21) Appl. No.: 16/652,649

(22) PCT Filed: Dec. 12, 2017

(86) PCT No.: PCT/EP2017/082451
§ 371 (c)(1),
(2) Date: Mar. 31, 2020

(87) PCT Pub. No.: WO2019/114934
PCT Pub. Date: Jun. 20, 2019

(65) Prior Publication Data
US 2020/0242603 A1 Jul. 30, 2020

(51) Int. Cl.
*G06Q 20/40* (2012.01)
*H04L 9/06* (2006.01)

(52) U.S. Cl.
CPC ......... *G06Q 20/401* (2013.01); *H04L 9/0637* (2013.01); *H04L 2209/38* (2013.01); *H04L 2209/80* (2013.01)

(58) Field of Classification Search
CPC . G06Q 20/401; H04L 9/0637; H04L 2209/38; H04L 2209/80

USPC .......................................................... 705/75
See application file for complete search history.

(56) References Cited

U.S. PATENT DOCUMENTS

| 10,194,320 B1* | 1/2019 | Egner ................... H04L 9/0819 |
| 2019/0109877 A1* | 4/2019 | Samuel ................. H04L 63/123 |
| 2021/0201396 A1* | 7/2021 | Soundararajan ... G06Q 20/3829 |

OTHER PUBLICATIONS

Raju et al., ("Identity Management using Blockchain for Cognitive Cellular Networks", IEEE ICC 2017 Communication and Information Systems Security Symposium, Jul. 25, 2017, 6 pages) (Year: 2017).*
Ragmondo, "Bitcoin Wifi hotspot demo part 1", Youtube, Aug. 27, 2013, p. 1.

(Continued)

*Primary Examiner* — James D Nigh
(74) *Attorney, Agent, or Firm* — Kunzler Bean & Adamson

(57) ABSTRACT

Apparatuses, methods, and systems are disclosed for network access using blockchain payments. One apparatus includes a processor and a transceiver that receives an authentication request message for a remote unit, the authentication request message including a remote unit identifier, the remote unit identifier indicating the remote unit is requesting network access via a blockchain payment. The processor generates an address for a blockchain network indicated by the remote unit identifier for receiving the blockchain payment. The transceiver receives a blockchain payment information message from the remote unit and the processor provides network access to the remote unit in response to successfully validating the received blockchain payment information.

20 Claims, 11 Drawing Sheets

(56) References Cited

OTHER PUBLICATIONS

Kris "Bitcoin WiFi Hotspot—Ready for Production, and shipping Worldwide to customers", Bitcoin Forum, Apr. 9, 2014, pp. 1-14.
Legkodymov, "Bounty 20 BTC: Wi-Fi Hotspot, enabled by bitcoin", Bitcoin Forum, May 11, 2011, pp. 1-57.
PCT/EP2017/082451, "Notification of Transmittal of the International Search Report and the Written Opinion of the International Searching Authority, or the Declaration", PCT, dated Sep. 10, 2018, pp. 1-11.
Ragmondo, "Video of hte RAsperry Pi Bitcoin Wifi Hotspot from a client/user point of view", Reddit, Aug. 28, 2013, pp. 1-5.
Techcrunch, "Wificoin lets you buy hotspot access with cryptocurrency | Disrupt SF Hackathon", Youtube, Sep. 18, 2017, pp. 1-10.
Legkodymov, "Wi-Fi Hotspot enbled by bitcoin", Rugatu, May 12, 2011, pp. 1-5.

\* cited by examiner

PROVIDING NETWORK ACCESS USING BLOCKCHAIN PAYMENTS

FIELD

The subject matter disclosed herein relates generally to wireless communications and more particularly relates to network access using blockchain payments.

BACKGROUND

The following abbreviations and acronyms are herewith defined, at least some of which are referred to within the following description.

Third Generation Partnership Project ("3GPP"), Authentication, Authorization & Accounting ("AAA"), Access and Mobility Management Function ("AMF"), Carrier Aggregation ("CA"), Clear Channel Assessment ("CCA"), Control Channel Element ("CCE"), Channel State Information ("CSI"), Common Search Space ("CSS"), Downlink Control Information ("DCI"), Downlink ("DL"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multipath TCP ("MPTCP"), Multi User Shared Access ("MUSA"), Narrowband ("NB"), Network Function ("NF"), Next Generation Node B ("gNB"), Policy Control & Charging ("PCC"), Policy Control Function ("PCF"), Quality of Service ("QoS"), Quadrature Phase Shift Keying ("QPSK"), Radio Resource Control ("RRC"), Receive ("RX"), Switching/Splitting Function ("SSF"), Scheduling Request ("SR"), Session Management Function ("SMF"), System Information Block ("SIB"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Ultra-reliability and Low-latency Communications ("URLLC"), and Worldwide Interoperability for Microwave Access ("WiMAX").

Today it is very common to obtain network access by making an online payment. The payment typically guarantees network access for some time period or until some amount of data has been consumed. However, the payment process can be very time consuming and requires user intervention. In most cases, the user is redirected to a payment portal where he/she must provide credit card details or login to an online wallet (e.g., PAYPAL™) and authorize the payment. With the introduction of blockchain technologies, however, payments for network access can become very fast and seamless, requiring almost no user intervention.

BRIEF SUMMARY

Methods for network access using blockchain payments are disclosed. Apparatuses and systems also perform the functions of the methods. In some embodiments, a method of a network function for network access using blockchain payments includes receiving an authentication request message for a remote unit, the authentication request message including a remote unit identifier, the identifier indicating that the remote unit (e.g., a UE) is requesting network access via a blockchain payment, and generating an address for a blockchain network indicated by the remote unit identifier for receiving the blockchain payment. The method includes receiving a blockchain payment information message from the remote unit and providing network access to the remote unit in response to successfully validating the received blockchain payment information.

Another method of a user equipment for network access using blockchain payments includes transmitting, by the user equipment, an authentication response message to a mobile communication network, the authentication response message including a remote unit identifier, the identifier indicating that the user equipment is requesting network access via a blockchain payment. The method includes receiving an address for a blockchain network indicated by the remote unit identifier and transmitting a blockchain payment information message associated with a blockchain payment to the received address. The method includes receiving network access in response to successful validation of the blockchain payment information message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
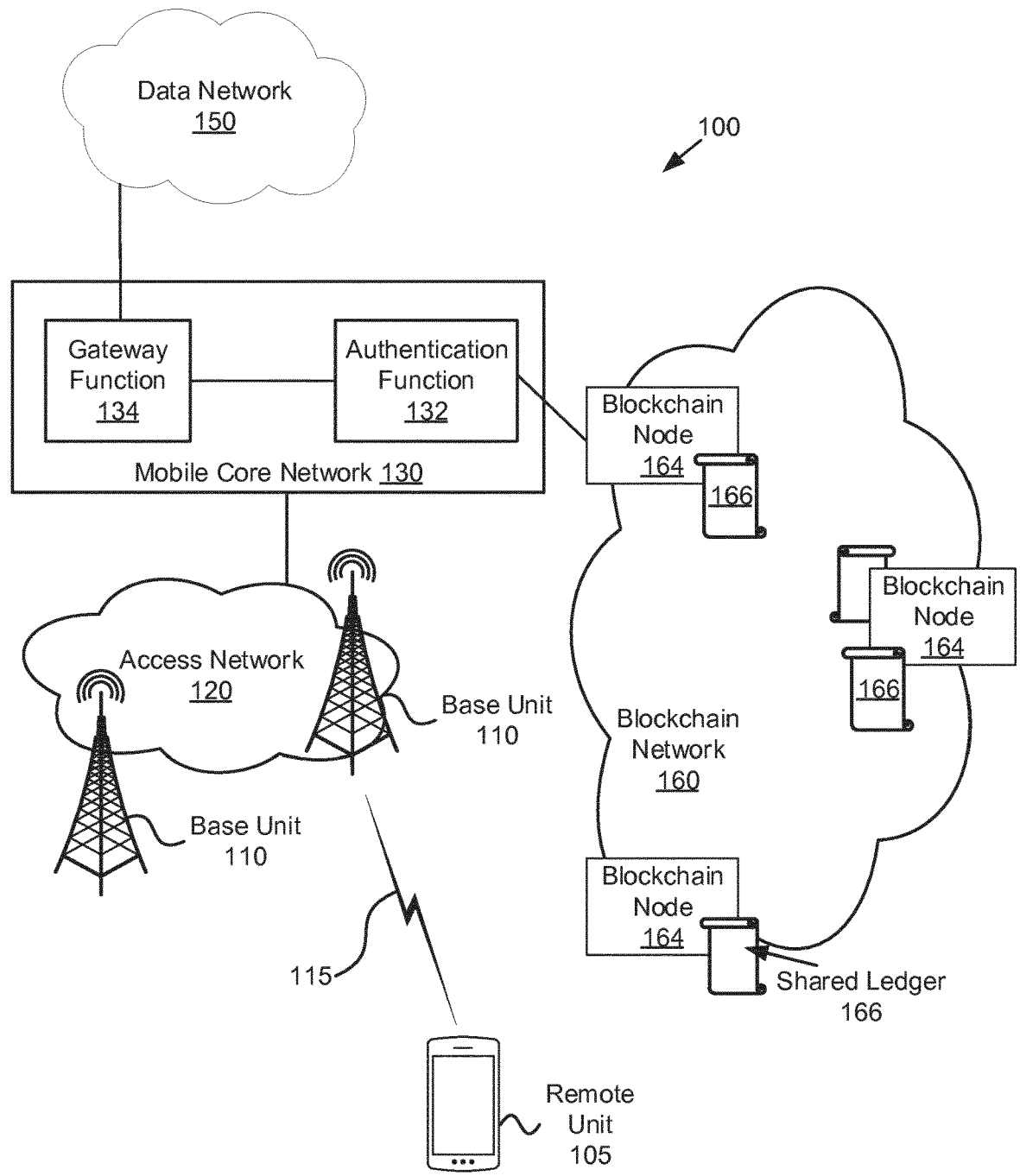
FIG. 1 is a schematic block diagram illustrating one embodiment of a wireless communication system for network access using blockchain payments.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

The disclosed embodiments consider online payments made via a blockchain network. Such payments can be nearly real-time (fast) and can trigger a sequence of other events, such as the creation and the assignment of connection information packages. Advantageously, this makes it possible for a mobile user to access a visited network (e.g., a mobile network or a WLAN network) even when the visited network does not have a roaming agreement with the user's home network.

Disclosed herein is a new method for enabling fast and seamless network access by making payments on a blockchain. Since the Extensible Authentication Protocol (EAP) is typically used for access control, we introduce a new EAP method, called EAP-CRY, which is used to enable blockchain payments during the network access procedure. In various embodiments, the system architectures and the procedures described herein facilitate network access with the EAP-CRY method.

FIG. 1 depicts a wireless communication system 100 for network access using blockchain payments, according to embodiments of the disclosure. In one embodiment, the wireless communication system 100 includes at least one remote unit 105, an access network 120 containing at least one base unit 110, wireless communication links 115, a mobile core network 130, and a blockchain network 160. Even though a specific number of remote units 105, access networks 120, base units 110, wireless communication links 115, mobile core networks 130, and blockchain networks 160 are depicted in FIG. 1, one of skill in the art will recognize that any number of remote units 105, access networks 120, base units 110, wireless communication links 115, mobile core networks 130, and blockchain networks 160 may be included in the wireless communication system 100. In another embodiment, the access network 120 contains one or more WLAN (e.g., WI-FI™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 may serve a number of remote units 105 within a serving area, for example, a cell or a cell sector via a wireless communication link 115. The base units 110 may communicate directly with one or more of the remote units 105 via communication signals.

Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to a mobile core network (e.g., in the visited network 130) via the access network 120.

In one embodiment, the mobile core network is a 5G core ("5GC") or the evolved packet core ("EPC"), which may be coupled to a data network 150, like the Internet and private data networks, among other data networks. Each mobile core network belongs to a single public land mobile network ("PLMN"). The present disclosure is not intended to be limited to the implementation of any particular wireless communication system architecture or protocol.

The mobile core network 130 includes several network functions ("NFs"), including control plane functions (such as the Authentication Function 132) and user plane functions (such as the Gateway Function 134). As understood in the art, a mobile core network may include such control plane functions as an Access and Mobility Management Function ("AMF"), a Session Management Function ("SMF"), a Policy Control Function ("PCF"). The Gateway Function 134 provides access to external data networks 150. The Gateway Function 134 has an interface to the Authentication Function 132 and is configured by the Authentication Function 132 with rules that can apply certain limitations to the traffic between a UE and the data networks 150.

The Authentication Function 132 is a server that authorizes (or forbids) access to the network after running an authentication procedure with the remote unit 105. In one embodiment, the Authentication Function 132 implements an Extensible Authentication Protocol ("EAP") server and the authentication procedure is an EAP exchange. Note that the Authentication Function 132 has an interface to one or more blockchain nodes 164 in the blockchain network 160. Via this interface the Authentication Function 132 can make new blockchain transactions (payments) or confirm the existence of prior blockchain payments.

The blockchain network 160 is a peer-to-peer network that maintains a secure shared ledger 166, e.g., a list of transactions that have occurred in the past. This list of transactions is organized into blocks linked together, thus the name "blockchain." The blockchain network 160 is composed of multiple (typically thousands) of blockchain nodes 164, every one of which maintains a copy of the shared ledger 166, also known as the "blockchain." The blockchain network 160 provides application programming interfaces (APIs) that can be used by applications to interact with the blockchain. As an example, an application may use an API call to trigger a blockchain transaction, e.g., to transfer some funds to an account, or to be notified when his/her account receives new funds. Applications using the blockchain via appropriate APIs can be external to a blockchain node 164 or internal to a blockchain node 164. In some embodiments, the blockchain network 160 supports an external API (e.g., a JSON-RPC API) for use by external applications and a separate internal API (e.g., a JavaScript™ API) for use by the internal applications.

To request access to the data network 150 via the access network 120 (and the mobile core network) in exchange for a blockchain payment, the remote unit 105 implicitly signals to the mobile core network a request to purchase network access via a blockchain payment when it sends a remote unit identifier associated with the blockchain network 160. The remote unit 105 submits its payment to the mobile core network 130 and, using its interface to the blockchain network 160, the Authentication Function 132 validates the payment and broadcasts the transaction to the blockchain network 160. The Gateway Function 134 then grants network access to the remote unit 105.

Beneficially, the wireless system 100 eliminates the need for a visited network or roaming agreements between networks, as the remote unit 105 is able to make a blockchain payment in exchange for network access.

Figure 2:
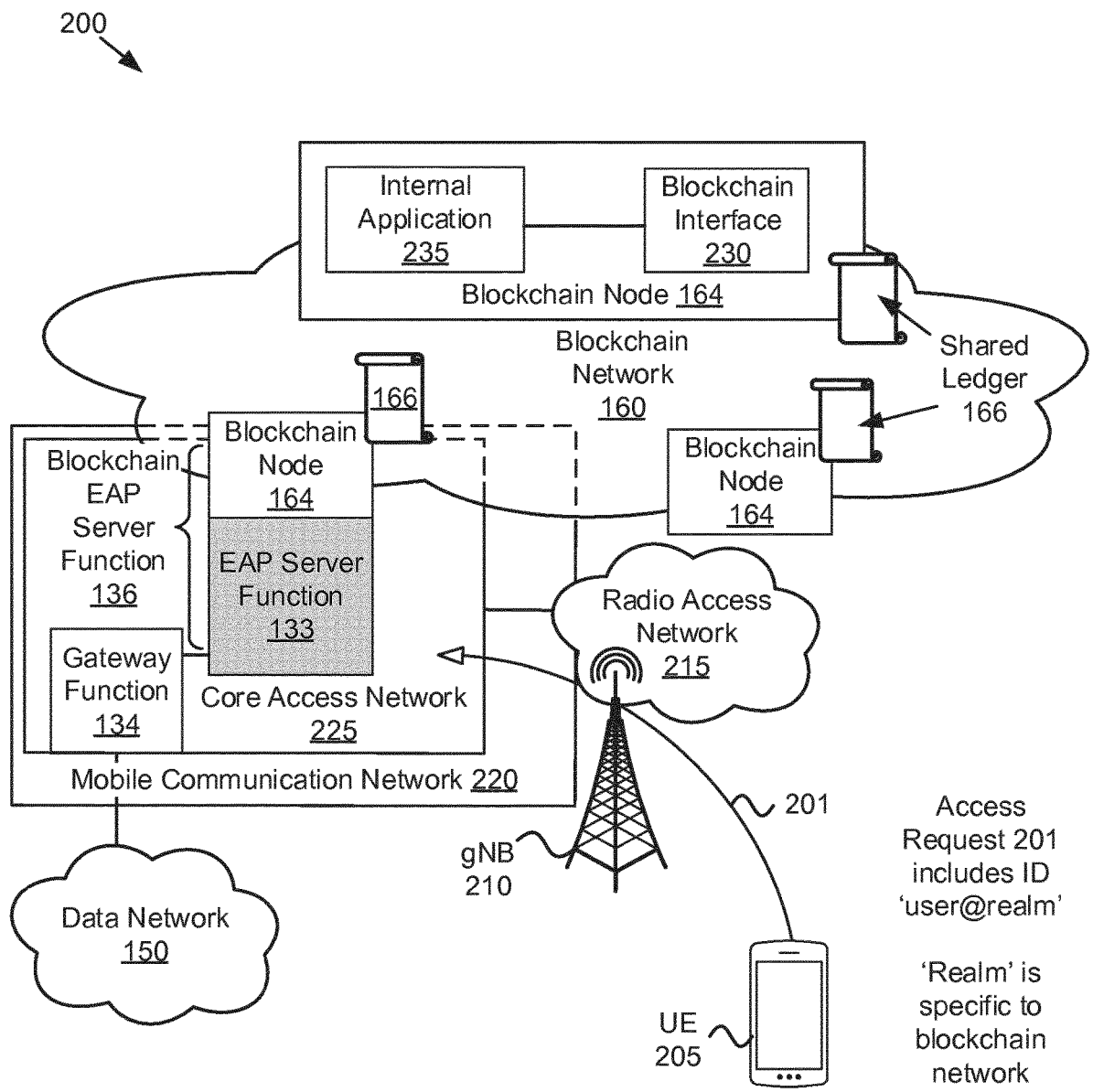
FIG. 2 is a block diagram illustrating another embodiment of a wireless communication system for network access using blockchain payments.

FIG. 2 depicts a network architecture 200 used for network access using blockchain payments, according to embodiments of the disclosure. The network architecture 200 may be modification of the wireless communication system 100. As depicted, the network architecture 200 includes a UE 205, a gNB 210, a radio access network ("RAN") 215, a mobile communication network 220, and a blockchain network 160. Here, the UE 205 may be one embodiment of the remote unit 105, and the gNB 210 may be one embodiment of the base unit 110, discussed above. The gNB 210 is a part of the RAN 215, which itself is part of the mobile communication network 220. Here, the mobile communication network 220 includes the RAN 215 and a core access network 225, which may be one embodiment of the mobile core network 130, discussed above.

The core access network 225 includes a gateway function 134, an EAP server function 133, and a blockchain node 164. The EAP server function 133 may be one embodiment of the authentication function 132 discussed above. The EAP server function 133 and the blockchain node 164 are co-located, forming a blockchain EAP server function ("BESF") 136. This means that the core access network 225 is a part of the blockchain network 160.

As depicted, the UE 205 sends an access request 201 to the mobile communication network 220. Here, the access request 201 includes a username and realm of the UE 205 (depicted here as "user@realm"). The specific realm includes will point to a blockchain network 160 through which the UE 205 desires to make a payment.

Figure 3:
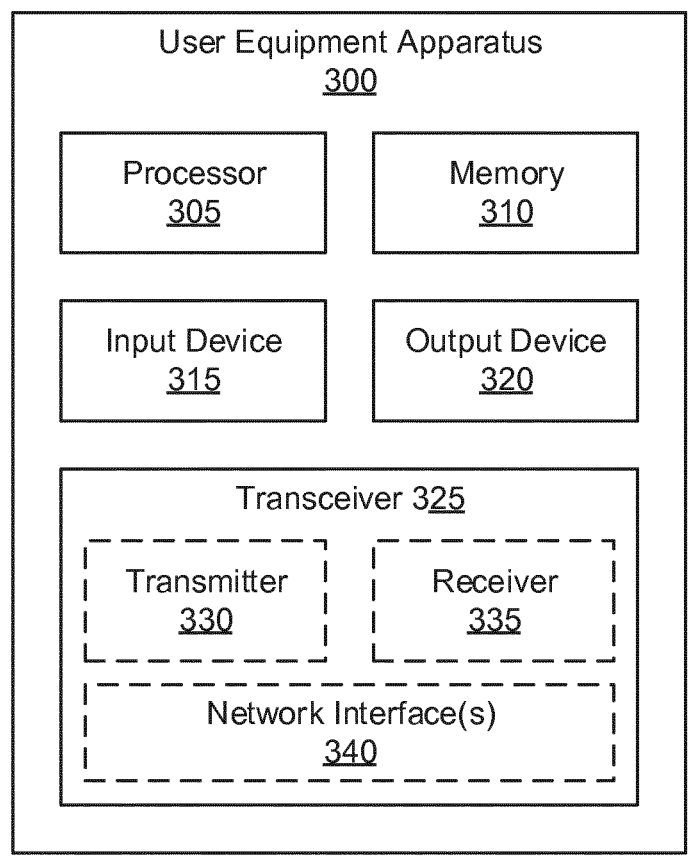
FIG. 3 a schematic block diagram illustrating one embodiment of a user equipment apparatus for network access using blockchain payments.

FIG. 3 depicts one embodiment of a user equipment apparatus 300 that may be used for network access using blockchain payments, according to embodiments of the disclosure. The user equipment apparatus 300 may be one embodiment of the remote unit 105 and/or the UE 205. Furthermore, the user equipment apparatus 300 may include a processor 305, a memory 310, an input device 315, a display 320, and a transceiver 325. In some embodiments, the input device 315 and the display 320 are combined into a single device, such as a touch screen. In certain embodiments, the user equipment apparatus 300 may not include any input device 315 and/or display 320.

As depicted, the transceiver 325 includes at least one transmitter 330 and at least one receiver 335. Additionally, the transceiver 325 may support at least one network interface 340. Here, the network interface 340 facilitates communication with a base unit 110 and the mobile core network 130.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the transceiver 325 transmits an authentication response message to an authentication server in a mobile communication network, such as the BESF 136. Here, the authentication response message includes a remote unit identifier belonging to the user equipment apparatus 300, such as a network address identifier ("NAI") or user equipment identifier ("UEID"), which indicates that the remote unit is requesting network access via a blockchain payment. In one example, the remote unit identifier is an NAI with a domain or realm specific to a blockchain network through which the remote unit desires to make blockchain payment. Here, different blockchain networks may have their own domains/realms, such that the desired blockchain network is easily identified by the NAI. Moreover, the use of an NAI with a domain or realm specific to a blockchain network indicates to the authentication server that the user equipment apparatus 300 is requesting network access via a blockchain payment. Thus, the processor 305 implicitly signals its request to use a blockchain payment to access the network (as opposed to using a subscription or account with the network) by sending an authentication response message that includes the remote unit identifier associated with the blockchain network.

Additionally, the transceiver 325 receives, from the mobile communication network an address of a blockchain network (e.g., a first blockchain address). Here, the first blockchain address is a pay-to address in the blockchain network which was indicated by the remote unit identifier. In various embodiments, the user equipment apparatus 300 does not rely on a network subscription to gain network access, but instead makes a blockchain payment to the mobile communication network in order to gain network access.

In some embodiments, the pay-to address is included within a payment request message received via the transceiver 325. Here, the payment request message may include the generated address and one or more value options. As used herein, a value option refers to a quantity of network access (e.g., measured by time and/or data consumption) to be received in exchange for an amount of value (e.g., payment amount). Each value option in the payment request message indicates an amount of network access and corresponding payment value. In embodiments, the processor 305 controls the display 320 to present the one or more value options to the user. Moreover, the processor 305 may also control the display 320 to present an option to indicate a prior transaction. The input device 315 may receive a selection of a specific value option.

In response to receiving the pay-to address in the indicated blockchain network (and in response to receiving user selection of a value option or indication of a prior transaction), the processors 305 generates a blockchain payment information message associated with the indicated blockchain network. In one embodiment, the received blockchain payment information includes a new blockchain transaction (e.g., in response to the user selecting one of the value options). In another embodiment, the received blockchain payment information is a reference to a prior blockchain transaction (e.g., in response to the user indicating a prior transaction).

Where the blockchain payment information includes a new blockchain transaction, the transmitted blockchain payment information message indicates the value to be paid corresponding to the selected value option. Further, the blockchain payment information message may contain a blockchain transaction. Alternatively, the blockchain payment information message may contain sufficient parameters for the authentication server to generate a blockchain transaction on behalf of the user equipment apparatus 300. In various embodiments, the transmitted blockchain payment information also includes a public key of the user equipment apparatus 300.

Where the blockchain payment information includes a reference to a prior blockchain transaction, the transmitted blockchain payment information message may contain a transaction ID and/or signature. In certain embodiments, the processor 305 determines whether the referenced prior transaction has any remaining value. For example, where the blockchain payment purchases a block of time, the processor 305 may determine whether any time remains. As another example, where the blockchain payment purchases a quantity of data (e.g., 1 GB), the processor 305 may determine whether any data remains. Additionally, the authentication server validates the transmitted lock chain payment information message in response to the authentication server validating the blockchain payment information message, the user equipment apparatus 300 receives network access (e.g., to the mobile communication network). In certain embodiments, the user equipment apparatus 300 is granted limited access until the blockchain transaction is confirmed. Note that the authentication server receives a plurality of confirmation messages from the blockchain network in response to the blockchain payment/transaction. Here, each confirmation message confirms successful "mining" and insertion of the transaction the shared ledger 166 of the blockchain network 160. Moreover, the mobile communication network provides network access to the user equipment apparatus 300 at a variety of levels based on the number of received confirmation messages.

For example, the mobile communication network may provide a first level of network access in response to validating the blockchain transaction and prior to receiving a first confirmation message. Here, the first level of network access is a reduced level of access which limits at least one of a traffic rate of the remote unit, a number of destinations accessible to the remote unit via the network, and a number of communication protocols and ports accessible to the remote unit. As another example, mobile communication network may provide a second level of network access in response to receiving a first confirmation message. Here, the second level of neck work access is an intermediate level access which relaxes some, but not all, of the limits of the first level of network access. As a further example, the mobile communication network may provide a third level of network access in response to receiving a threshold number of confirmation messages. Here, the third level of access is a full level of access which removes all the traffic limitations of the first level of access and the second level of access.

In various embodiments, the transceiver 325 receives confirmation message containing an encrypted master session key for protecting traffic between the user equipment apparatus 300 and a base unit. Here, the processor 305 decrypts the master session key using the private key of the user equipment apparatus 300. The transceiver 325 receives confirmation message in response to the authentication server validating the received blockchain payment information (e.g., validating a new transaction or validating a prior referenced transaction). Where the received blockchain payment information references a prior transaction, the processor 305 generates a new master session key.

In various embodiments, the processor 305 initiates an EAP session when communicating with the authentication server. In one embodiment, the processor 305 initiates an EAP-CRY session with the authentication server, with the payment request message being the first message of the EAP-CRY session. Moreover, the blockchain payment information message and confirmation message (including the message containing the encrypted master session key) are transmitted within the EAP-CRY session.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to network access using blockchain payments, for example storing session keys, transaction IDs, blockchain addresses, remote unit identifiers, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

In certain embodiments, the transceiver 325 is configured to communicate with the base unit 110 and with one or more network functions of a mobile communication network such as the authentication server. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335. As discussed above, the transceiver 325 may support one or more the network interface 340 for communicating with the base unit 110 and/or authentication server.

Figure 4:
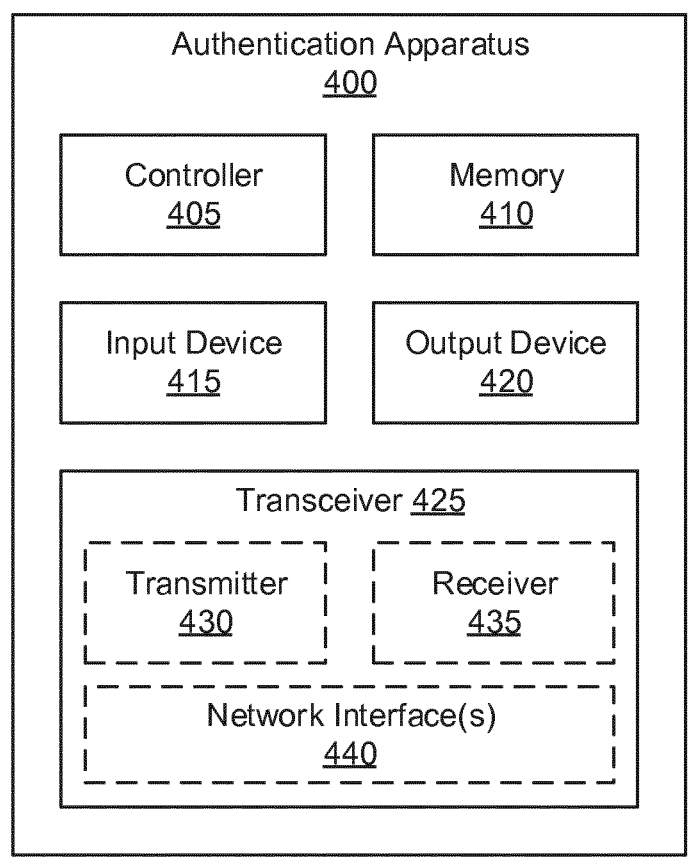
FIG. 4 a schematic block diagram illustrating one embodiment of an authentication apparatus for network access using blockchain payments.

FIG. 4 depicts one embodiment of an authentication apparatus 400 that may be used for network access using blockchain payments, according to embodiments of the disclosure. The authentication apparatus 400 may be one embodiment of the authentication function 132 and/or the BESF 136. Furthermore, the authentication apparatus 400 may include a processor 405, a memory 410, an input device 415, a display 420, and a transceiver 425. In some embodiments, the input device 415 and the display 420 are combined into a single device, such as a touch screen. In certain embodiments, the authentication apparatus 400 may not include any input device 415 and/or display 420.

As depicted, the transceiver 425 includes at least one transmitter 430 and at least one receiver 435. Additionally, the transceiver 425 may support at least one network interface 440. Here, the network interface 440 facilitates communication with one or more network functions, such as the gateway function 134, and one or more blockchain nodes 164 in the blockchain network 160. Moreover, the transceiver 425 facilitates communication with a remote unit 105, such as the UE 205, via the base unit 110 (or gNB 210).

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the transceiver 425 receives an authentication request message for a remote unit, such as the UE 205. Here, the authentication request message includes a remote unit identifier, such as a network address identifier ("NAI") or user equipment identifier ("UEID"), which indicates that the remote unit is requesting network access via a blockchain payment. In one example, the remote unit identifier is an NAI with a domain or realm specific to a blockchain network through which the remote unit desires to make blockchain payment. Here, different blockchain networks may have their own domains/realms, such that the desired blockchain network is easily identified by the NAI. Moreover, the use of an NAI with a domain or realm specific to a blockchain network indicates to the authentication apparatus 400 that the remote unit is requesting network access via a blockchain payment. Thus, the remote unit implicitly signals its request to use a blockchain payment to access the network (as opposed to using a subscription or account with the network) by sending the remote unit identifier associated with the blockchain network.

Upon receiving the authentication message, the processor 405 examines the remote unit identifier. In one embodiment, the remote unit has a subscription and the authentication apparatus 400 is located in a home network (e.g., H-PLMN) for the remote unit. In another embodiment, the remote unit has a subscription in another network and the authentication apparatus 400 is located in a visited network (e.g., V-PLMN). In various embodiments, the remote unit does not rely on a network subscription to gain network access, but instead makes a blockchain payment via the authentication apparatus 400 in order to gain network access.

In response to the remote unit requesting network access via a blockchain payment, the processor 405 generates a first address for the blockchain network indicated by the remote unit identifier (e.g., a first "blockchain address"). The first address is a "pay-to" address for receiving the blockchain payment. In some embodiments, the processor 405 generates a new pay-to address in the blockchain network indicated by the remote unit identifier (e.g., NAI realm). As an example, the blockchain network indicated by the remote unit identifier may be the Bitcoin™ network, wherein the processor 405 generates a new Bitcoin™ address to accept the payment. Throughout this disclosure, embodiments describe making Bitcoin™ payments, as Bitcoin™ is a well-known example of blockchain technology. However, other blockchain technologies may be used with the described embodiments and may even perform better than the Bitcoin™ network, e.g., due to offering shorter transaction confirmation delays.

In certain embodiments, the processor 405 may reuse a previously generated blockchain address as the pay-to address for receiving the blockchain payment. In other embodiments, the processor 405 creates a new address each time a new payment should be made, in order to enhance anonymity and security. Additionally, the processor 405 controls the transceiver 425 to send the generated blockchain network address to the remote unit.

In some embodiments, the processor 405 controls the transceiver 425 to send a payment request message to the remote unit. Here, the payment request message may include the generated address and one or more value options. As used herein, a value option refers to a quantity of network access (e.g., measured by time and/or data consumption) to be received in exchange for an amount of value (e.g., payment amount). Each value option in the payment request message indicates an amount of network access and corresponding payment value.

The transceiver 425 receives payment information from the remote unit. In response to receiving the payment information, the processor 405 validates the received payment information and provides network access to the remote unit in response to successfully validating the received payment information. In one embodiment, the received blockchain payment information includes a blockchain transaction. In another embodiment, the received blockchain payment information is a reference to a prior blockchain transaction.

Note that the transceiver 425 receives a plurality of confirmation messages from the blockchain network in response to the blockchain payment/transaction. Here, each confirmation message confirms successful "mining" and insertion of the transaction the shared ledger 166 of the blockchain network 160. Moreover, the processor 405 provides network access to remote unit at a variety of levels based on the number of received confirmation messages.

For example, the processor 405 may provide a first level of network access in response to validating the blockchain transaction and prior to receiving a first confirmation message. Here, the first level of network access is a reduced level of access which limits at least one of a traffic rate of the remote unit, a number of destinations accessible to the remote unit via the network, and a number of communication protocols and ports accessible to the remote unit. As another example, processor 405 may provide a second level of network access in response to receiving a first confirmation message. Here, the second level of neck work access is an intermediate level access which relaxes some, but not all, of the limits of the first level of network access. As a further example, the processor 405 may provide a third level of network access in response to receiving a threshold number of confirmation messages. Here, the third level of access is a full level of access which removes all the traffic limitations of the first level of access and the second level of access.

Where the received blockchain payment information includes a new blockchain transaction, the received blockchain payment information message indicates a value to be paid corresponding to a selected value option. For example, the remote unit may present the various value options to the user, wherein the user selects a value option which is then included in the blockchain payment information message. Further, the blockchain payment information message may contain a blockchain transaction. Alternatively, the blockchain payment information message may contain sufficient parameters for the processor 405 to generate a blockchain transaction on behalf of the remote unit. In various embodiments, the received blockchain payment information also includes a public key of the remote unit.

Where the received blockchain payment information includes a reference to a prior blockchain transaction, the received blockchain payment information message may contain a transaction ID and/or signature. Here, the processor 405 validates the blockchain payment information by looking up the reference transaction ID and determining (e.g., using the signature) whether the referenced prior transaction was made by the remote unit (or user associated with remote unit). Further, the processor 405 determines whether the referenced prior transaction has any remaining value. For example, where the blockchain payment purchases a block of time, the processor 405 may determine whether any time remains. As another example, where the blockchain payment purchases a quantity of data (e.g., 1 GB), the processor 405 may determine whether any data remains.

Where the referenced prior transaction has remaining value, the processor 405 generates a confirmation message and grants network access until there is no remaining value associated with the transaction. If the referenced price transaction does not have remaining value (or was not made by the same user or remote unit), then the processor 405 generates a payment request message and controls the transceiver 45 to send the payment request message to the remote unit.

In various embodiments, the processor 405 generates a master session key for protecting traffic in the remote unit. Here, the processor 405 generates the master session key in response to validating the received blockchain payment information (e.g., validating a new transaction or validating a prior referenced transaction). Where the received blockchain payment information references a prior transaction, the processor 405 generates a new master session key.

Moreover, the processor 405 encrypts the generated master session key using a public key associated with the remote unit and controls the transceiver 425 to send the encrypted master session keys the remote unit. For example, the processor 405 may include the encrypted master session key in a confirmation message. Thereafter, the remote unit uses its private key (e.g., corresponding to the public key sent in the blockchain payment information message) to decrypt the master session key. The master session key serves as a common key between the remote unit and the access network for protecting the traffic on the air interface. Accordingly, the processor 405 controls the transceiver 425 to send a copy of the master session key to the base unit through which the remote unit accesses the network.

In various embodiments, the processor 405 initiates an EAP session when communicating with remote unit. In one embodiment, the processor 405 initiates an EAP-CRY session in response to generating the new pay-to address, with the payment request message being the first message of the EAP-CRY session. Moreover, the blockchain payment information message and confirmation message (including the message containing the encrypted master session key) are transmitted within the EAP-CRY session. Here, EAP-CRY is an EAP method running on top of EAP, as discussed below with reference to FIG. 7.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to network access using blockchain payments, for example storing session keys, transaction IDs, blockchain addresses, remote unit identifiers, and the like. In certain embodiments, the memory 410 also stores program code and related data, such as an operating system or other controller algorithms operating on the authentication apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

In certain embodiments, the transceiver 425 is configured to communicate with the blockchain network 160, the remote unit 105 (via the base unit 110), and with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with the base unit 110 and/or remote unit 105.

Figure 5A:
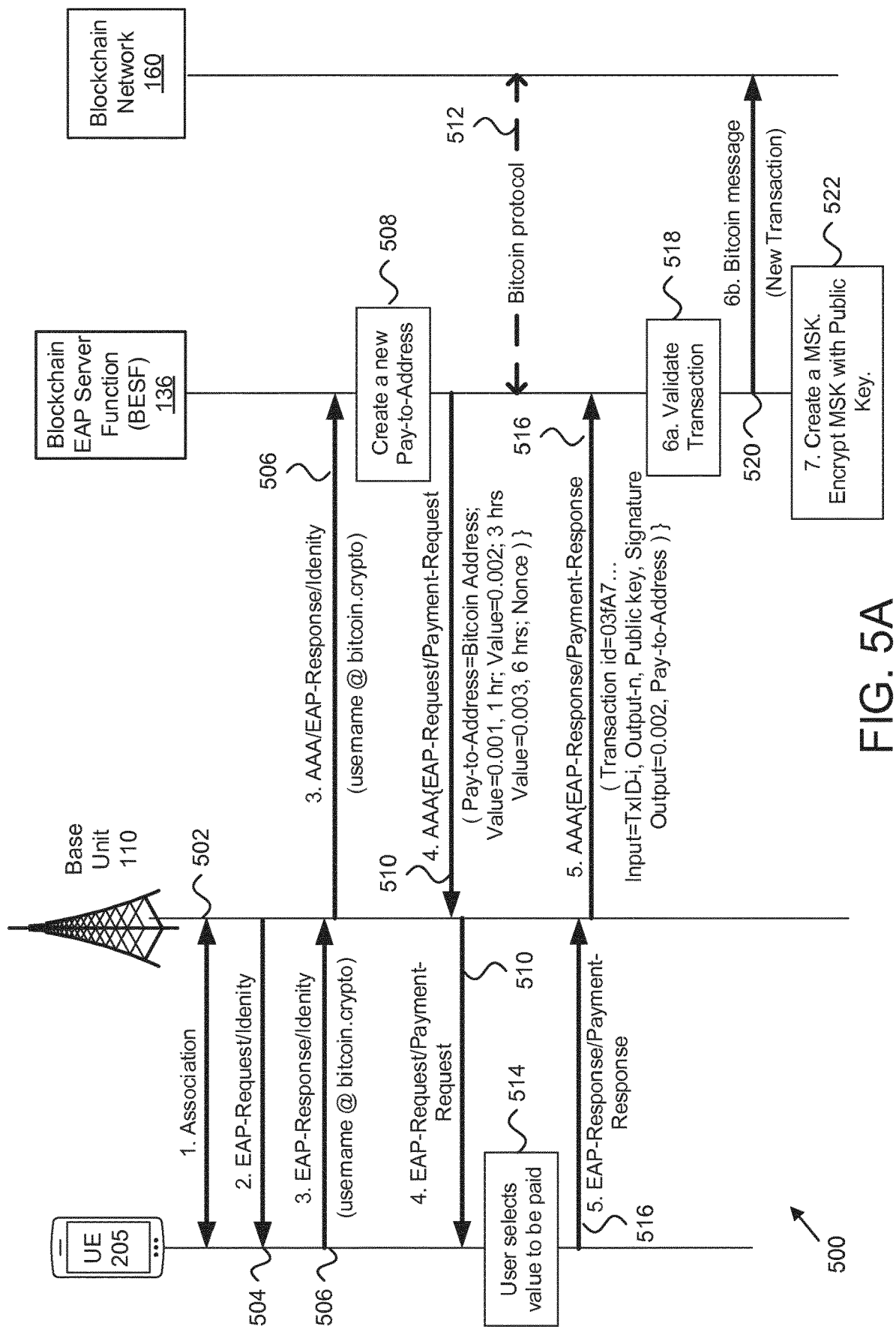
FIG. 5A is a block diagram illustrating one embodiment of a network procedure for network access using blockchain payments.
Figure 5B:
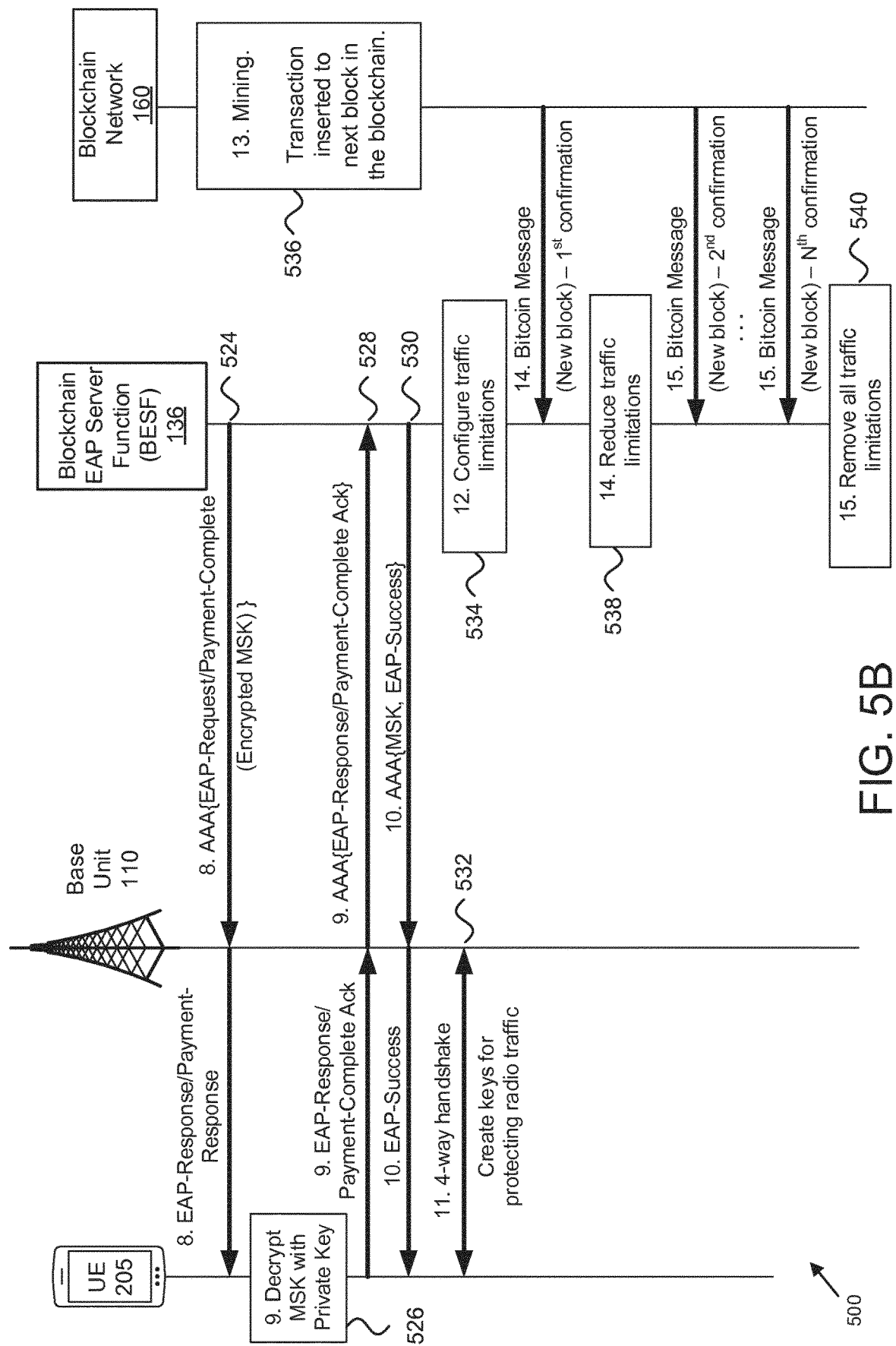
FIG. 5B is a continuation of the network procedure of FIG. 5A.

FIGS. 5A-5B depict a network procedure 500 for network access using blockchain payments, according to embodiments of the disclosure. The network procedure 500 depicts an example of a remote unit (e.g., the UE 205) making a blockchain transaction to gain network access. The network procedure 500 involves the UE 205, a base unit 110, the BESF 136, and the blockchain network 160.

At FIG. 5A, the network procedure 500 begins with the UE 205 selecting an access network (represented by the base unit 110) and performing network association with the base unit 110 (see signaling 502). In one embodiment, the base unit 110 is a gNB or eNB. In another embodiment, the base unit 110 is a wireless access point, such as a WI-FI™ hotspot or other WLAN AP.

After association, the base unit 110 initiates a EAP-based authentication procedure with the UE 205 (see signaling 504). Here, the UE 205 is requested to provide its NAI or other UE ID. Recall that an NAI has the form 'username@realm.'

The UE 205 provides its NAI (or other UE ID) to the base unit 110 (see signaling 506). Here, the NAI uses a special realm or domain name in order to indicate to the base unit 110 that the UE 205 wants to access the network by making a blockchain payment or cryptocurrency payment. Additionally, the realm of the NAI indicates which blockchain network the UE 205 prefers to pay with. For example, the realm 'bitcoin.crypto' may be used in the NAI to indicate that the UE 205 prefers to pay with bitcoins using the bitcoin blockchain network. Accordingly, by including the special realm, the UE 205 implicitly signals a request to access the network using a blockchain transaction.

Based on the provided realm, the base unit 110 sends an AAA request message to the BESF 136. Note that the BESF 136 is a backend function that is responsible to setup a payment session with the UE 205 and to authorize or reject the UE's access to the network by using an EAP-based method. Note that the 'username' value of the special NAI can have any value and is not used further in the network procedure 500.

The BESF 136 then creates a new pay-to address (see block 508). In this example, since the UE 205 indicates that it prefers to pay with bitcoins, the BESF 136 creates a new bitcoin address to accept the payment. In certain embodiments, a new address is created every time a new payment should be made in order to avoid using the same address and thus to enhance anonymity.

At this point, the BESF 136 starts an EAP-CRY session with the UE 205 and sends an EAP-Request message carrying a Payment-Request message, the EAP-Request message encapsulated into an AAA message (see signaling 510). The EAP-Request/Payment-Request message is a EAP-CRY message that includes the created pay-to address and one or more Value options. In certain embodiments, the EAP-Request/Payment-Request message includes a Nonce parameter that is used when the UE has made a prior payment to this network. This is further discussed below with reference to FIG. 6. Note that the EAP-CRY is an EAP method running on top of EAP, as discussed below with reference to FIG. 7. The EAP-Request or EAP-Response is an EAP message that carries an EAP-CRY message, such as 'Payment-Request,' or 'Payment-Response,' or 'Payment-Complete.'

In one embodiment, a Value option indicates the value to be paid in order to allow network access for some time period. For example, a Value option (0.001, 1 hour) indicates that a payment of 0.001 bitcoins should be made to allow network access for 1 hour. In another embodiment, a Value option indicates the value to be paid in order to allow network access for some amount of traffic. For example, a Value option (0.001, 1 GByte) indicates that a payment of 0.001 bitcoins should be made to allow network access until 1 GByte of traffic has been consumed.

In one embodiment, the UE 205 presents a payment request to the user in response to receiving the EAP-Request/Payment-Request message. In certain embodiments, the UE 205 determines whether a prior payment has been made to the network and has remaining value. FIG. 6 describes the scenario where a prior payment was made. However, in the network procedure 500 is it assumed that there is no prior payment, thus the UE 205 asks the user to authorize a new payment and to select the value to be paid (see block 514). In the depicted example, the user selects to pay 0.002 bitcoins in order to access the network for 3 hours.

In response to the user selecting a Value option, the UE 205 sends a blockchain payment information message, such an EAP-Response/Payment-Response message, to the BESF 136 (see signaling 516) that includes a regular bitcoin transaction (recall the realm indicated a bitcoin payment and the pay-to address is a bitcoin address). According to the bitcoin specifications, this transaction includes: 1) a Transaction Identity ("TxID"), 2) one or more Inputs, and 3) one or more Outputs. Each Input refers to a previous bitcoin transaction (TxID-i) and an output in this references transaction (Output-n). This referenced output indicates the bitcoins that were previously received by the user and will now be spent for making this payment (e.g., 0.002 bitcoins). In addition, each Input includes a Public Key and a Signature which prove that the user owns the bitcoins in the referenced output, e.g., the UE 205 holds the necessary private key. One Output indicates the value of bitcoins to be paid to the pay-to address (e.g., 0.002 bitcoins). An additional Output can be included to return change to the sender (e.g., when the referenced output in the Input is higher than the paid value of 0.002 bitcoins).

The BESF 136, which maintains a copy of the bitcoin blockchain, validates the transaction sent by the UE 205 (see block 518). Here, validation refers to confirming that the bitcoins in the referenced output are not already spent and that they are owned by the user who makes the payment. If the validation is successful, then a new transaction is broadcast in the blockchain network which will be processed as normally by all blockchain nodes (see signaling 520).

The BESF 136 then creates a new Master Session Key ("MSK", see block 522). For example, this key can be created randomly or by using any other appropriate method. Then the BESF 136 encrypts the MSK by using the public key of the UE 205 (e.g., sent prior by the UE 205 in the blockchain payment information message). The purpose of MSK is to serve as a common key between the UE 205 and the access network (e.g., base unit 110) for protecting the traffic on the air-interface. In case of WI-FI™ access networks, the MSK is used to derive a Pairwise Master Key (PMK) and other child keys, as specified in IEEE 802.11 specification. If needed, the BESF 136 may also create an Extended MSK. Note, that the MSK and EMSK are keys created from a successful EAP method run (here, the EAP-CRY method).

The procedure 500 continues at FIG. 5B with the BESF 136 sending the encrypted MSK to the UE 205 inside an EAP-Request/Payment-Complete message (see signaling 524). The UE 205 then uses the associated private key to decrypt the MSK (see block 526) and then responds with an EAP-Response/Payment-Complete-Ack message (see signaling 528).

The BESF 136 completes the EAP-CRY procedure by sending an EAP-Success message (see signaling 530). Via the EAP-Success message, the BESF 136 forwards the MSK to the base unit 110 so that it can protect the traffic on the air-interface. The UE 205 and the base unit 110 create keys for protecting the traffic on the air-interface by using the common MSK (see signaling 532). In the case of the base unit 110 being a WI-FI™ access network, these keys can be created by means of the 4-way handshake specified in IEEE 802.11i.

At this point, the UE 205 has submitted a payment (the new bitcoin transaction in signaling 516) which was validated by the BESF 136 and was broadcast in the blockchain network 160. Note, however, that this payment is not yet confirmed by the blockchain network 160. Until the payment is fully confirmed the mobile communication network may apply limitations to the traffic associated with the UE 205 (see block 534). For example, the UE 205 may be initially limited to a first level.

In one example of traffic limitations, the mobile communication network may accept the UE 205, but limit the traffic rate of the UE 205 to some predefined value. In another example of traffic limitations, the mobile communication network may accept the UE 205, but allow the UE 205 to access only some predefined domains (e.g., google.com, facebook.com, etc.). These limitations could be defined by BESF 136 and be relayed to the Gateway Function 134, that is responsible to enforce them.

The payment transaction is already inserted into a bitcoin blockchain and goes through the normal mining process which may last for a long period of time. In case of bitcoin, the mining may typically take from 10 min to a couple of hours, but for other blockchain networks 160 the mining may be considerably shorter (e.g., 1-3 min). After the payment transaction is mined, it is inserted into a new block in the blockchain and the block is broadcast through the entire blockchain network 160. This way, it is also received by the BESF 136 which is part of the blockchain network 160. At this point, the payment transaction has one confirmation and, as a result, the BESF 136 may instruct the Gateway Function 134 to reduce the traffic limitations for the UE 205 (e.g., to increase the maximum traffic rate, etc., see block 538). Now the UE 205 is granted a second level of access.

As more and more bitcoin blocks are mined, the payment transaction receives more and more confirmations. When the BESF 136 determines that enough confirmations have been received (e.g., a threshold of N confirmations), then it instructs the Gateway Function 134 to remove the traffic limitations of the first and second levels for the UE 205 (see block 540). Note that there may still be limitations placed on the UE 205 unrelated to the payment confirmation. The procedure 500 ends.

Figure 6A:
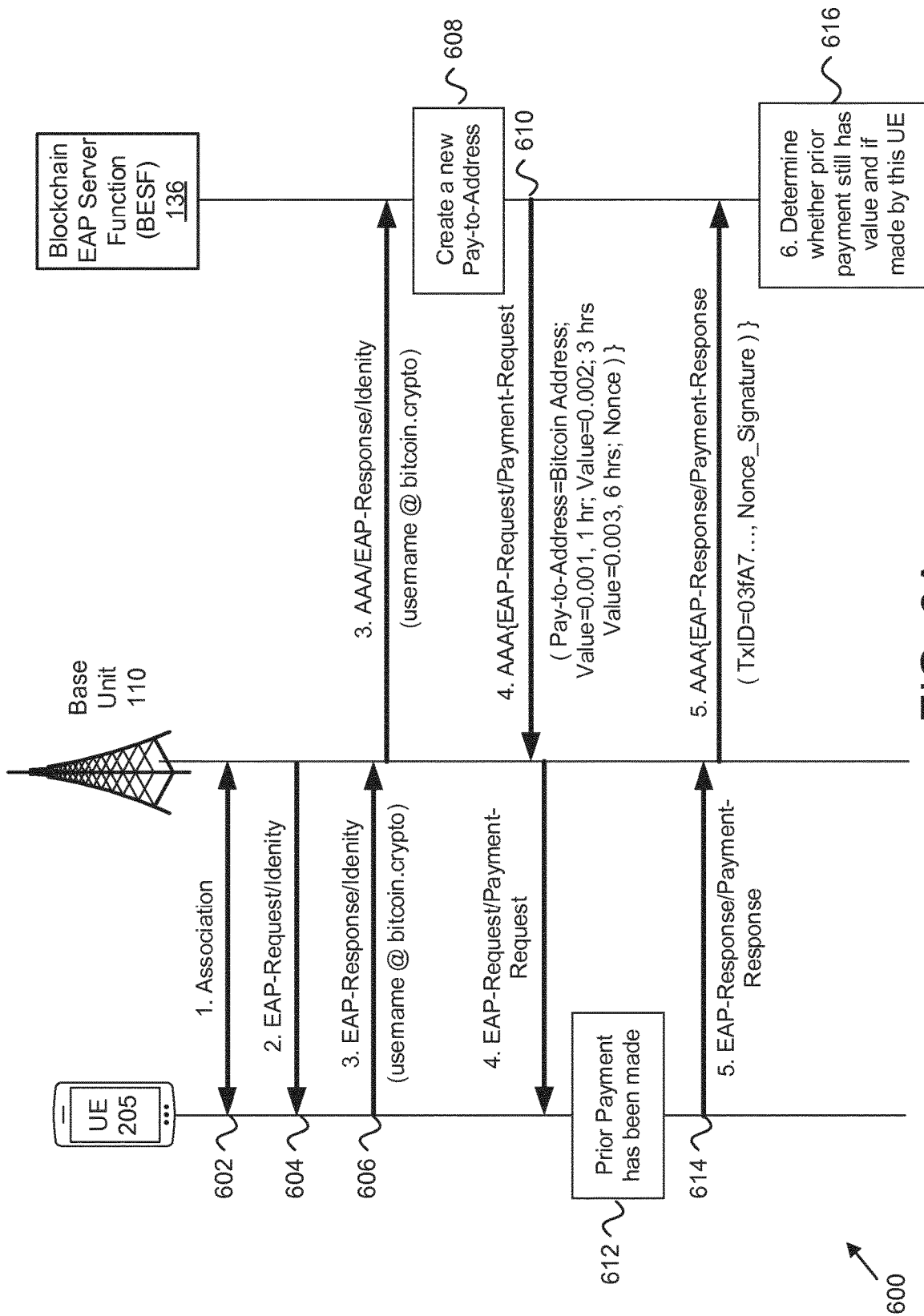
FIG. 6A is a block diagram illustrating another embodiment of a network procedure for network access using blockchain payments.
Figure 6B:
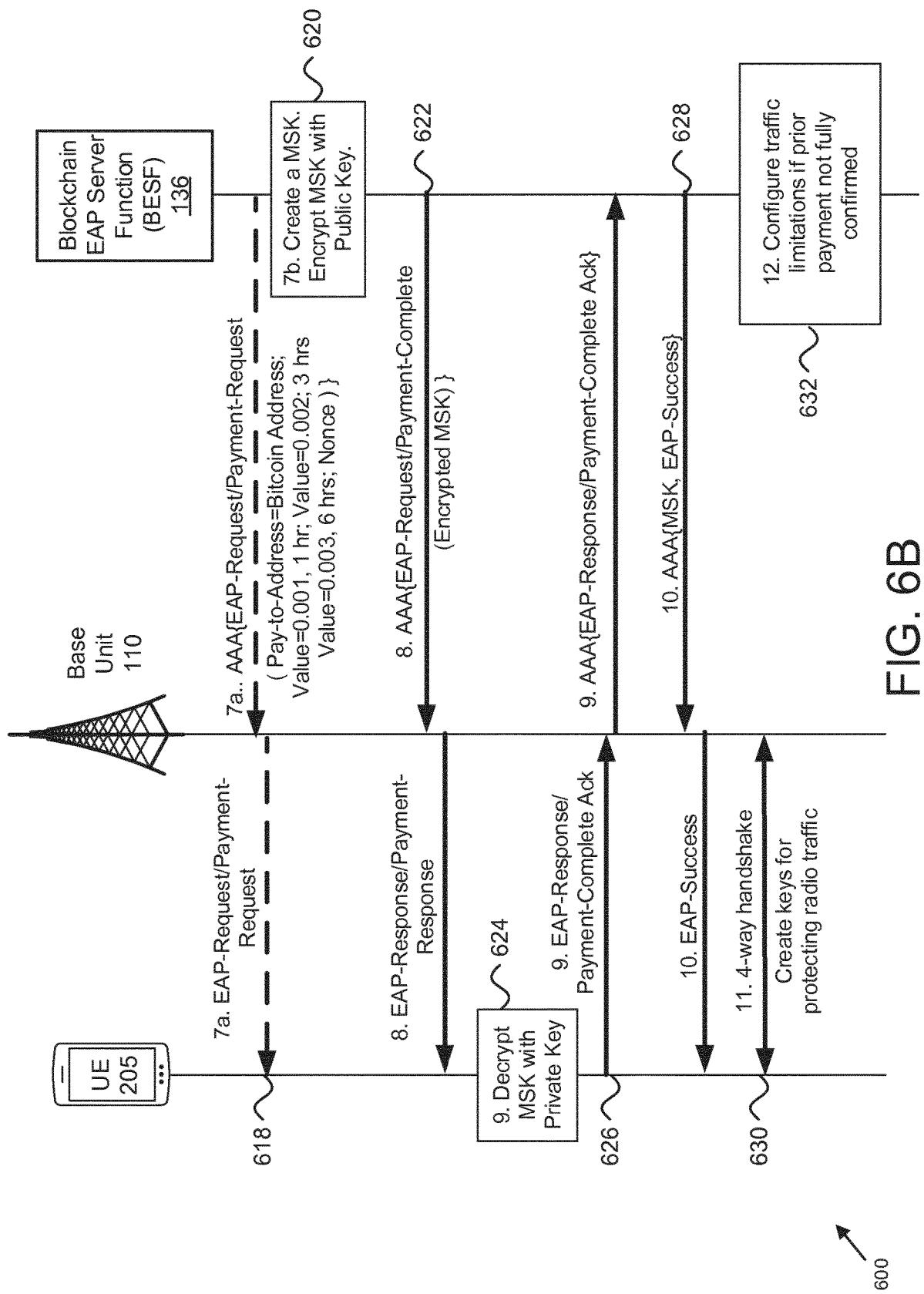
FIG. 6B is a continuation of the network procedure of FIG. 6A.

FIGS. 6A-6B depict a network procedure 600 for network access using blockchain payments, according to embodiments of the disclosure. The network procedure 600 depicts an example of a remote unit (e.g., the UE 205) requesting network access based on a prior payment to the blockchain network. The network procedure 600 involves the UE 205, a base unit 110, and the BESF 136. Here, the UE 205 has already made a blockchain payment and does not need to make another blockchain payment due to remaining value in the prior transaction. Because the UE 205 attempts to access the network again before the prior transaction expires, the UE 205 refers to the prior blockchain payment and proves it was the one to make the payment.

At FIG. 6A, the network procedure 600 begins with the UE 205 selecting an access network (represented by the base unit 110) and performing network association with the base unit 110 (see signaling 602). After association, the base unit 110 initiates a EAP-based authentication procedure with the UE 205 (see signaling 604). Here, the UE 205 is requested to provide its NAI or another UE ID. Recall that an NAI has the form 'username@realm.'

The UE 205 provides its NAI (or other UE ID) to the base unit 110 (see signaling 506). Here, the NAI uses a special realm or domain name in order to indicate to the base unit 110 that the UE 205 wants to access the network by making a blockchain payment or cryptocurrency payment. Additionally, the realm of the NAI indicates which blockchain network the UE 205 prefers to pay with. Accordingly, by including the special realm, the UE 205 implicitly signals a request to access the network using a blockchain transaction.

Based on the provided realm, the base unit 110 sends an AAA request message to the BESF 136. Note that the BESF 136 is a backend function that is responsible to setup a payment session with the UE 205 and to authorize or reject the UE's access to the network by using an EAP-based method. Note that the 'username' value of the special NAI can have any value and is not used further in the network procedure 600.

The BESF 136 then creates a new pay-to address (see block 608). In this example, since the UE 205 indicates that it prefers to pay with bitcoins, the BESF 136 creates a new bitcoin address to accept the payment. In certain embodiments, a new address is created every time a new payment should be made in order to avoid using the same address and thus to enhance anonymity.

At this point, the BESF 136 starts an EAP-CRY session with the UE 205 by sending an EAP-Request/Payment-Request message, encapsulated into an AAA message (see signaling 610). This EAP-CRY message is a payment request message that includes the created pay-to address and one or more Value options, as discussed above. In one embodiment, the UE 205 present a payment request to the user in response to receiving the EAP-Request/Payment-Request message.

In certain embodiments, the UE 205 determines whether a prior payment has been made to the network and has remaining value. Here, is it assumed that there was prior payment with remaining value. Thus, the UE 205 determines (e.g., based on stored prior transactions) that it has already made a payment to access this network (see block 612).

Therefore, the UE 205 sends an EAP-Response/Payment-Response that does not include a new payment transaction, but includes only a reference to a prior transaction (TxID) and a Nonce_Signature (see signaling 614). The Nonce_Signature is derived by using the Nonce received in the payment request message (see signaling 610) and the private key that was used to sign the prior transaction. Essentially, the Nonce_Signature confirms that the UE 205 is the one which made the referred prior transaction.

Because the BESF 136 knows the public key associated with the referenced prior transaction, it uses the public key together with Nonce_Signature to confirm that the UE 205 is really the one which made the prior transaction 'TxID' (see block 616). Moreover, the BESF 136 also confirms that the prior transaction (e.g., payment) still has remaining value, e.g., its validity period has not expired, or its maximum data volume has not been reached (see block 616).

Continuing at FIG. 6B, if the BESF 136 determines that the referenced prior transaction (e.g., payment) does not have remaining value, or that the UE 205 is not the one which made this transaction, then the BESF 136 sends another EAP-Request/Payment-Request asking the UE 205 to make a new payment (see optional signaling 618). In this case a Nonce is not provided. When the UE 205 responds to the second payment request message (e.g., by making a new blockchain payment), the procedure shown in FIG. 5 is executed starting from the signaling 516. Here, it is assumed that the referenced prior transaction has remaining value.

In response to confirming/validating the referenced prior transaction, the BESF 136 then creates a new Master Session Key ("MSK", see block 620) and encrypts the MSK by using the public key of the UE 205. The BESF 136 sends the encrypted MSK to the UE 205 inside an EAP-Request/Payment-Complete message (see signaling 622). The UE 205 then uses the associated private key to decrypt the MSK (see block 624) and then responds with an EAP-Response/Payment-Complete-Ack message (see signaling 626).

The BESF 136 completes the EAP-CRY procedure by sending an EAP-Success message (see signaling 628). Via the EAP-Success message, the BESF 136 forwards the MSK to the base unit 110 so that it can protect the traffic on the air-interface. The UE 205 and the base unit 110 create keys for protecting the traffic on the air-interface by using the common MSK (see signaling 630). In the case of the base unit 110 being a WI-FI™ access network, these keys can be created by means of the 4-way handshake specified in IEEE 802.11i.

If the prior payment is not fully confirmed, the mobile communication network may apply limitations to the traffic associated with the UE 205 (see block 632). Here, the BESF 136 may define traffic limitations based on the number of received transaction confirmation messages and relay them to the Gateway Function 134 for enforcement, as discussed above. The procedure 600 ends.

Figure 7:
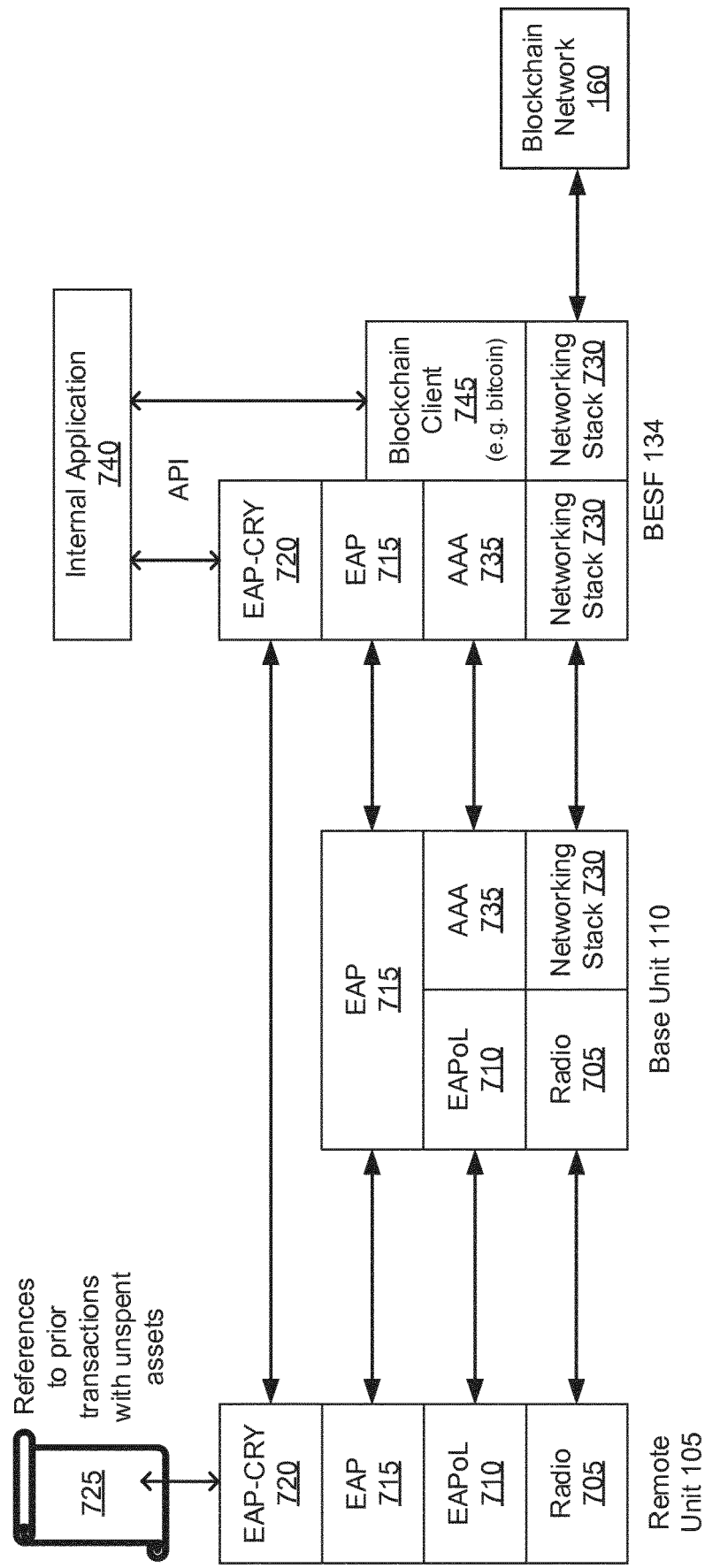
FIG. 7 is a schematic block diagram illustrating one embodiment of a protocol architecture for network access using blockchain payments.

FIG. 7 depicts a protocol architecture 700 for network access using blockchain payments, according to embodiments of the disclosure. Here, the protocol architecture 700 involves the remote unit 105, the base unit 110, and the BESF 136.

The protocol stack of the remote unit 105 includes a radio layer 705 which comprises the lower layers used to communicate with the base unit 110 over the air interface. Here, it is assumed that the base unit 110 is a WLAN AP, such as a WI-FI™ hotspot), thus the radio layer 705 may include a WLAN layer and an IP layer (e.g., IPv4/v6). The remote unit 105 also includes an EAPoL layer 710 and an EAP layer 715. Note that the base unit 110 also has a corresponding Radio layer 705, EAPoL layer 710, and EAP layer 715 terminating connections with the layers in the remote unit 105.

Additionally, the base unit 110 includes a networking stack 730 and a AAA layer 735. Each of these terminates in a corresponding layer in the BESF 136. Also, the base unit 110 and the BESF 136 each have an EAP layer 715. Both the remote unit 105 and the BESF 136 include a EAP-CRY layer 720. The EAP-CRY is an EAP method whose protocol runs between the remote unit 105 and the BESF 136. Note that the EAP-CRY method runs on top of EAP. During an EAP-CRY session EAP-Request and/or EAP-Response messages are used to carry an EAP-CRY message, such as a Payment-Request, Payment-Response, Payment-Complete, Payment-Complete-Ack, or the like.

Also, an internal application 740 links the EAP-CRY layer 720 to the blockchain client 745. Suitable APIs are used by the internal application 740 in order to communicate with the EAP-CRY protocol (e.g., with EAP-CRY 720) and with the blockchain client 745, which provides access to the blockchain network 160. Another networking stack 730 is used between the BESF 136 and the blockchain network 160.

Note that the EAP-CRY layer 720 of the remote unit 105 has access to a list of payment transactions that were conducted by the remote unit in the past. Using the list, the remote unit can determine whether there is a prior payment with remaining value, as discussed above with reference to FIGS. 6A-6B. Also, note that the blockchain client 745 in the BESF 136 has access to the entire list of transactions recorded in the blockchain network 160.

Figure 8:
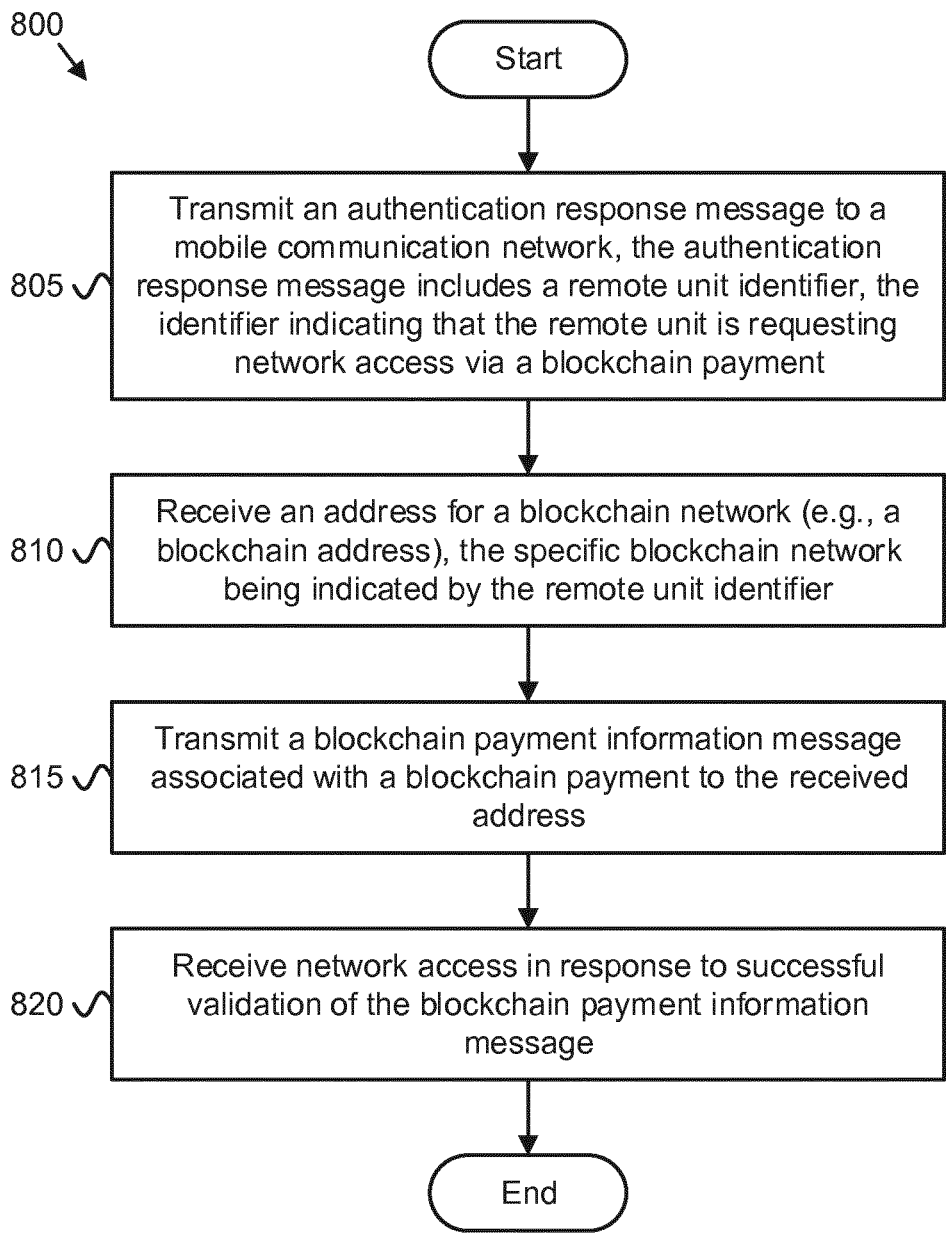
FIG. 8 is a schematic flow chart diagram illustrating one embodiment of a method for network access using blockchain payments.

FIG. 8 depicts a method 800 for network access using blockchain payments, according to embodiments of the disclosure. In some embodiments, the method 800 is performed by a remote unit, such as the remote unit 105, the UE 205, and/or the user equipment apparatus 300. In certain embodiments, the method 800 may be performed by a processor executing program code, for example, a microcontroller, a microprocessor, a CPU, a GPU, an auxiliary processing unit, a FPGA, or the like.

The method 800 begins with transmitting 805, by a remote unit, an authentication response message to a mobile communication network. Here, the authentication response message includes a remote unit identifier, the identifier indicating that the remote unit is requesting network access via a blockchain payment.

The method 800 includes receiving 810 an address for a blockchain network (e.g., a blockchain address), the specific blockchain network being indicated by the remote unit identifier. In one embodiment, receiving 810 the address for the blotchy network includes initiating an EAP session, wherein the addresses received via the EAP session. Moreover, various messages with the mobile communication network may be exchanged using the EAP method (e.g., corresponding to the EAP session).

The method 800 includes transmitting 815 a blockchain payment information message associated with a blockchain payment to the received address. In certain embodiments, the blockchain payment information message is transmitted in response to receiving a payment request message from the mobile communication network, the payment request message including the generated address and one or more value options, each value option indicating an amount of network access and a corresponding payment value. In one embodiment, the transmitted blockchain payment information message includes a new blockchain transmission. In such an embodiment, the transmitted blockchain payment information message indicates a value to be paid corresponding to a selected one of the one or more value options.

In another embodiment, transmitting 815 the blockchain payment information message comprises transmitting a reference to the prior transaction in a response to the payment request message. Here, in response to receiving the payment request message, the remote unit determines to access the mobile communication network using a prior transaction (e.g., a prior transaction having remaining value and being made by the same user and/or remote unit).

The method 800 includes receiving 820 network access in response to successful validation of the blockchain payment information message. The method 800 ends. In some embodiments, receiving 820 network access includes receiving an encrypted master session key from the mobile communication network and decrypting the master session key with a private key of the remote unit. For example, the transmitted blockchain payment information message may include a public key of the remote unit, wherein the encrypted master session key is decrypted using the corresponding private key. Where the blockchain payment information message reference to prior transaction, the master session key may be a new master session key. Moreover, receiving 820 network access includes using the master session key to protect traffic communicated with the mobile communication network, e.g., over an air interface.

In one embodiment, receiving 820 network access includes receiving a first level of access in response to validating the blockchain payment information message and prior to the mobile communication network receiving a first transaction confirmation message. In another embodiment, receiving 820 network access includes receiving a second level of access in response to the mobile communication network receiving the first transaction confirmation message. In a further embodiment, receiving 820 network access includes receiving a third level of access in response to the mobile communication network receiving a threshold number of transaction confirmation messages. In these embodiments, the first level of access is a reduced level of access, the second level of access is an intermediate level of access, and the third level of access is a full level of access. Here, the third level of access removes the traffic limitations of the first level of access and of the second level of access. In certain embodiments, the first level of access limits at least one of a traffic rate of the remote unit, a number of destinations accessible to the remote unit via the network and a number of communication protocols and ports accessible to the remote unit.

Figure 9:
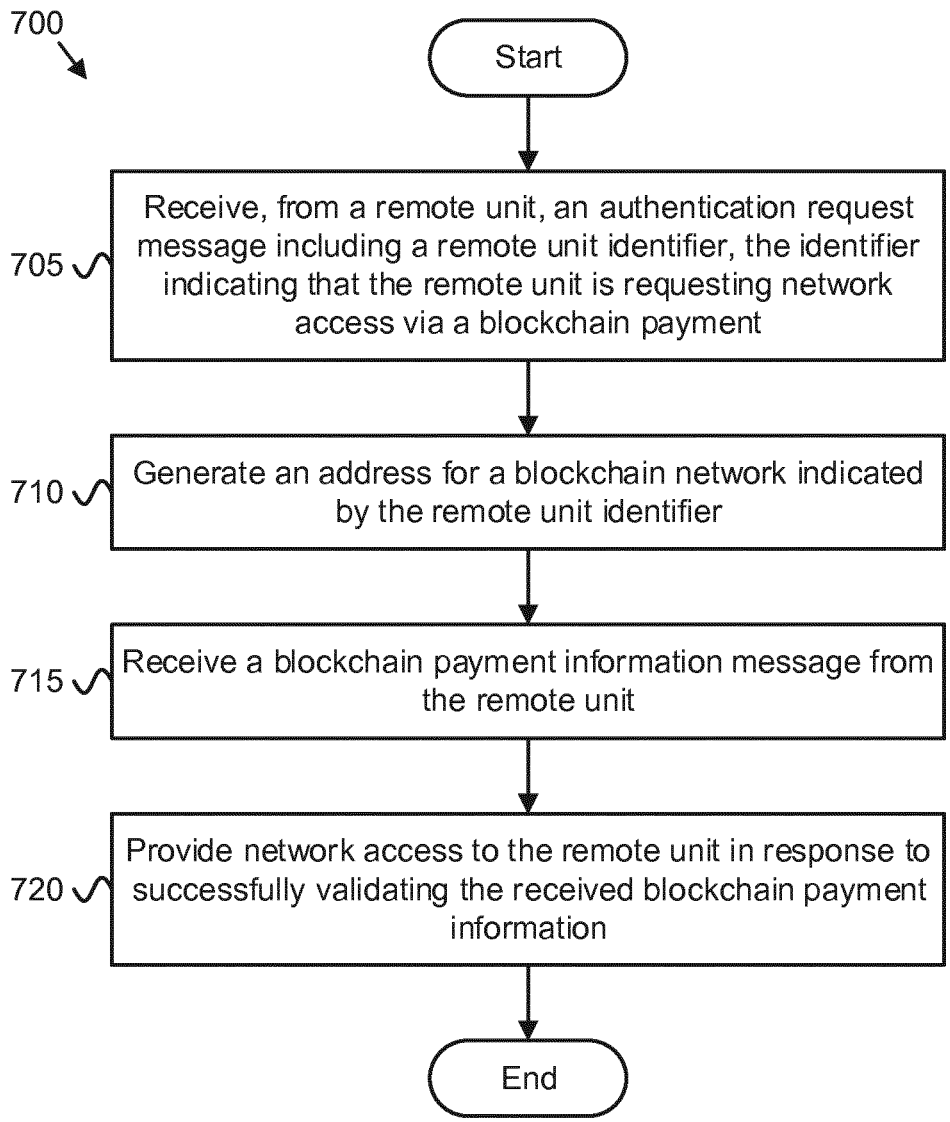
FIG. 9 is a schematic flow chart diagram illustrating another embodiment of a method for network access using blockchain payments.

FIG. 9 depicts a method 900 for network access using blockchain payments, according to embodiments of the disclosure. In some embodiments, the method 900 is performed by an apparatus, such as the authentication function 132, the BESF 136, and/or the authentication apparatus 400. In certain embodiments, the method 900 may be performed by a processor executing program code, for example, a microcontroller, a microprocessor, a CPU, a GPU, an auxiliary processing unit, a FPGA, or the like.

The method 900 begins with receiving 905, at an authentication function and from a remote unit, an authentication request message including a remote unit identifier. Here, unit identifier indicates that the remote unit is requesting network access via a blockchain payment. In one embodiment, the authentication request message is embodied in an EAP response message.

The method 900 includes generating 910 an address for a blockchain network indicated by the remote unit identifier. Here, the generated address is for receiving the blockchain payment. In one embodiment, a new address for each request for network access via a blockchain payment. In certain embodiments, generating 910 the address includes sending a payment request message to the remote unit, said payment request message including the generated address. Moreover, the payment request message may include one or more value options, each value option indicating an amount of network access and a corresponding payment value. Moreover, the generated address may be exchanged using an EAP method.

The method 900 includes receiving 915 a blockchain payment information message from the remote unit. In some embodiments, receiving 915 the blockchain payment information message includes validating the blockchain payment information. In certain embodiments, the blockchain payment information message is exchanged using the EAP method. In one embodiment, the received blockchain payment information message includes a new blockchain transaction. Here, the new blockchain transaction may indicate a value to be paid corresponding to a selected value option.

In another embodiment, the receipt watching payment information message references a prior blockchain transaction. Here, the authentication server determines whether the reference prior transaction was made by the remote unit and whether there is remaining value associated with the referenced prior transaction. In response to the referenced prior transaction not having any remaining value or in response to determining that the referenced prior transaction was not made by the remote unit, the authentication server may resend the payment request message. The resent payment message may include an error code indicating that the referenced prior transaction is not valid.

The method 900 includes providing 920 network access to the remote unit in response to successfully validating the received blockchain payment information. In some embodiments, providing 920 network access to the remote unit includes generating master session key for protecting traffic of the remote unit, encrypting the master session key with a public key of the remote unit, and sending the encrypted master session key to the remote unit. Here, the public key may be contained in the blockchain payment information message. Where the blockchain payment information references a prior transaction, the master session key may be a new master session key.

In certain embodiments, providing 920 network access to the remote unit includes providing various levels of network access. For example, providing 920 network access may include receiving a first level of access in response to validating the blockchain payment information message and prior to the mobile communication network receiving a first transaction confirmation message. In another embodiment, providing 920 network access may include receiving a second level of access in response to the mobile communication network receiving the first transaction confirmation message. In a further embodiment, providing 920 network access may include receiving a third level of access in response to the mobile communication network receiving a threshold number of transaction confirmation messages. In these embodiments, the first level of access is a reduced level of access, the second level of access is an intermediate level of access, and the third level of access is a full level of access. Here, the third level of access removes the traffic limitations of the first level of access and of the second level of access. In certain embodiments, the first level of access limits at least one of a traffic rate of the remote unit, a number of destinations accessible to the remote unit via the network and a number of communication protocols and ports accessible to the remote unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that receives an authentication request message for a remote unit, the authentication request message including a remote unit identifier, the remote unit identifier indicating that the remote unit is requesting network access via a blockchain payment; and
a processor that generates an address for a blockchain network indicated by the remote unit identifier for receiving the blockchain payment,
wherein the transceiver receives a blockchain payment information message from the remote unit and the processor provides network access to the remote unit in response to successfully validating payment information in the received blockchain payment information message.

2. The apparatus of claim 1, wherein the received blockchain payment information message includes a blockchain transaction.

3. The apparatus of claim 2, wherein the transceiver receives a plurality of confirmation messages from the blockchain network, each confirmation message confirming the blockchain transaction, wherein providing network access to the remote unit comprises the processor:
providing a first level of access in response to validating the blockchain transaction and prior to the transceiver receiving a first transaction confirmation message,
providing a second level of access in response to the transceiver receiving the first transaction confirmation message, and
providing a third level of access in response to the transceiver receiving a threshold number of confirmation messages,
wherein the first level of access is a reduced level of access, the second level of access is an intermediate level of access, and the third level of access is a full level of access.

4. The apparatus of claim 3, wherein the first level of access and the second level of access limit at least one of a traffic rate of the remote unit, a number of destinations accessible to the remote unit and a number of communication protocols and ports accessible to the remote unit, wherein the third level of access removes the traffic limitations of the first level of access and of the second level of access.

5. The apparatus of claim 1, wherein the blockchain payment information message is received in response to the transceiver sending a payment request message to the remote unit, the payment request message including the generated address and one or more value options, each value option indicating an amount of network access and a corresponding payment value.

6. The apparatus of claim 5, wherein the received blockchain payment information message indicates a value to be paid corresponding to a selected one of the one or more value options.

7. The apparatus of claim 1, wherein the received blockchain payment information message includes a public key of the remote unit, wherein providing network access to the remote unit comprises the processor:
generating a master session key for protecting traffic of the remote unit; and
encrypting the master session key with the public key of the remote unit, wherein the transceiver sends the encrypted master session key to the remote unit.

8. The apparatus of claim 1, wherein the received blockchain payment information message includes a reference to a prior transaction, wherein the processor validates the payment information by:
determining whether the prior transaction was made by the remote unit, and
determining whether the prior transaction has any remaining value.

9. The apparatus of claim 8, wherein the prior transaction includes a public key of the remote unit, wherein providing network access to the remote unit comprises the processor:
generating a new master session key for protecting traffic of the remote unit; and
encrypting the new master session key with the public key of the remote unit, wherein the transceiver sends the new encrypted master session key to the remote unit.

10. The apparatus of claim 8, wherein the transceiver further sends a second payment request message to the remote unit in response to the processor determining that the referenced prior transaction was not made by the remote unit or determining that the referenced prior transaction does not have any remaining value.

11. The apparatus of claim 1, wherein the authentication request message and the blockchain payment information message are exchanged by using an Extensible Authentication Protocol ("EAP") method.

12. A method comprising:
receiving an authentication request message for a remote unit, the authentication request message including a remote unit identifier, the remote unit identifier indicating that the remote unit is requesting network access via a blockchain payment;

generating an address for a blockchain network indicated by the remote unit identifier for receiving the blockchain payment;

receiving a blockchain payment information message from the remote unit; and providing network access to the remote unit in response to successfully validating payment information in the received blockchain payment information message.

13. An apparatus comprising:

a transceiver that:

transmits an authentication response message to a mobile communication network, the authentication response message including a remote unit identifier, the remote unit identifier indicating that the apparatus is requesting network access via a blockchain payment;

receives an address of a blockchain network indicated by the remote unit identifier;

transmits a blockchain payment information message associated with a blockchain payment to the received address; and receives network access in response to successful validation of the blockchain payment information message.

14. The apparatus of claim 13, wherein the transmitted blockchain payment information message includes a blockchain transaction.

15. The apparatus of claim 13, wherein the blockchain payment information message is transmitted in response to receiving a payment request message from the mobile communication network, the payment request message including the address in the blockchain network and one or more value options, each value option indicating an amount of network access and a corresponding payment value.

16. The apparatus of claim 15, wherein the transmitted blockchain payment information message indicates a value to be paid corresponding to a selected one of the one or more value options.

17. The apparatus of claim 13, wherein the transmitted blockchain payment information message includes a public key of the apparatus, wherein the transceiver receives an encrypted master session key from the mobile communication network, the apparatus comprising a processor that:

decrypts the master session key with a private key that corresponds to the public key included in the blockchain payment information message; and protects traffic communicated with the mobile communication network using the master session key.

18. The apparatus of claim 13, further comprising a processor that determines to access the mobile communication network using an unexpired prior transaction, wherein the transceiver further receives a payment request message from the mobile communication network, wherein transmitting the blockchain payment information message comprises the transceiver transmitting a reference to the prior transaction in a response to the payment request message.

19. The apparatus of claim 18, wherein the prior transaction includes a public key of the remote unit, wherein the transceiver receives a new encrypted master session key from the mobile communication network, the apparatus comprising a processor that:

decrypts the new master session key with a private key that corresponds to the public key included in the prior transaction; and protects traffic communicated with the mobile communication network using the new master session key.

20. The apparatus of claim 13, wherein the authentication request message and the blockchain payment information message are exchanged by using an Extensible Authentication Protocol ("EAP") method.

* * * * *